United States Patent
Zhu et al.

(10) Patent No.: US 7,133,327 B2
(45) Date of Patent: Nov. 7, 2006

(54) METHOD AND SYSTEM FOR MEASURING THE VELOCITY OF A VESSEL RELATIVE TO THE BOTTOM USING VELOCITY MEASURING CORRELATION SONAR

(75) Inventors: Weiqing Zhu, Beijing (CN); Changhong Wang, Beijing (CN)

(73) Assignee: Institute of Acoustics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 10/549,196

(22) PCT Filed: Dec. 12, 2003

(86) PCT No.: PCT/CN03/01060

§ 371 (c)(1),
(2), (4) Date: Sep. 16, 2005

(87) PCT Pub. No.: WO2004/083891

PCT Pub. Date: Sep. 30, 2004

(65) Prior Publication Data

US 2006/0171255 A1    Aug. 3, 2006

(30) Foreign Application Priority Data

Mar. 19, 2003 (CN) ............................. 03 1 19665
Nov. 24, 2003 (CN) ....................... 2003 1 0115153

(51) Int. Cl.
*G01S 15/60* (2006.01)

(52) U.S. Cl. .......................................... 367/91; 367/89

(58) Field of Classification Search .............. 367/89, 367/91; 73/597

See application file for complete search history.

(56) References Cited

U.S. PATENT DOCUMENTS

| | | | |
|---|---|---|---|
| 4,244,026 A | 1/1981 | Dickey et al. | |
| 4,635,240 A | 1/1987 | Geohegan et al. | |
| 4,905,209 A * | 2/1990 | Huang | 367/125 |
| 5,077,700 A * | 12/1991 | Shaw et al. | 367/91 |
| 5,315,562 A | 5/1994 | Rowe | |
| 5,339,283 A | 8/1994 | Gilmour et al. | |
| 5,381,384 A * | 1/1995 | Winje | 367/89 |
| 5,422,860 A | 6/1995 | Bradley et al. | |
| 6,804,167 B1 * | 10/2004 | Scoca et al. | 367/89 |

FOREIGN PATENT DOCUMENTS

CN    1224503 A    7/1999
RU    2010232 C1    3/1994

* cited by examiner

*Primary Examiner*—Ian J. Lobo
(74) *Attorney, Agent, or Firm*—Venable LLP; Manni Li

(57) ABSTRACT

A method and a system for measuring the velocity of a vessel relative to the bottom using a velocity measuring correlation sonar are disclosed. The present invention provides a new theoretical expression for the bottom medium sonar array temporal and spatial correlation function. The velocity of the vessel relative to the bottom is derived by fitting experimental data to a theoretical function. The bottom medium sonar array temporal and spatial correlation function of the present invention is succinctly expressed in zero-rank Bessel function, and well coincided with experiments. The function is applicable not only to far field region, i.e. planar wave region, but also to Fraunhofer region, i.e. spherical wave region. Transmit transducers and receive transducers are multistatic in the velocity measuring correlation sonar of the present invention, so the transmit beam width and the receive beam width can be selected reasonably. The present invention is applicable to measuring the velocity of the vessel relative to the bottom with high measurement accuracy, small calculation load, good robustness and fast convergence.

20 Claims, 5 Drawing Sheets

METHOD AND SYSTEM FOR MEASURING THE VELOCITY OF A VESSEL RELATIVE TO THE BOTTOM USING VELOCITY MEASURING CORRELATION SONAR

TECHINICAL FIELD

The present invention is related to a sonar velocity measuring field, and more concretely to a method and system for measuring the velocity of a vessel relative to the bottom using correlation velocity measuring sonar.

PRIOR ART

At present, methods for measuring velocity using correlation velocity measuring sonar are summarized as follows.

(1) U.S. Pat. No. 5,315,562, titled "Correlation Sonar System" invented by S. E. Bradley et al. discloses correlation sonar used for measuring current profile and velocities of a vessel in water relative to the bottom. This invention includes the following four aspects:

(A) A complex signal is transmitted. The complex signal's autocorrelation function has two different peaks at delay $\tau=0$ and $\tau=\tau_c$. The previous technology of transmitting two pulses that may cause interferences between medium layers of the fluid is eliminated.

(B) A theoretical expression for sonar array temporal and spatial correlation function for fluid medium and bottom medium is introduced in series forms, wherein bessel function and Legendary function are included, and a simplified expression based on experiences is proposed and adopted for signal processing because of its simplicity.

(C) Based on the maximum likelihood principle, by using the simplex method, the current velocities and the vessel's velocity relative to the bottom are derived by optimally fitting the theoretical and experimental sonar array temporal and spatial correlation functions.

(D) A matched filter approach is used for detecting the seabed echoes.

(E) Some transmit transducers and receive transducers of the sonar array are homeostatic.

(2) U.S. Pat. No. 5,422,860, titled "Correlation Sonar System" invented by S. E. Bradley et al. discloses a method to generate correlation sonar signals. Pseudo random phase-coded signal, whose autocorrelation function has two different peaks at delay $\tau=0$ and $\tau=\tau_c$, is transmitted.

The methods for measuring vessel's velocities relative to the bottom has obvious shortcomings: (1) The theoretical expression for sonar array temporal and spatial correlation function is so complex that it is difficult to use in practice; but the simplified expression derived from experience does not have sufficient physical foundation. This is the most important technology of correlation velocity measuring sonar system. (2) It is not the best method to fit the theoretical and experimental temporal and spatial correlation function by using simplex method based on the maximum likelihood principle. (3) It is also not the best method to use a velocity corresponding to the maximum value of the sonar array temporal and spatial correlation function as an initial value of velocity estimation. (4) The tactic that some transmit transducers and receive transducers of the sonar array are homeostatic limits the selection of transmit beam width and receive beamwidth.

SUMMARY OF THE INVENTION

The main objective of the invention is to provide a preferred theoretical bottom medium sonar array temporal and spatial correlation function for fitting with experimental data. Another objective of the invention is to improve the data processing method for data temporal and spatial correlation function. The last objective of the invention is to improve the transducer geometry in the conventional sonar array.

In order to achieve the objectives mentioned above, the present invention provides a method for measuring velocities of the vessel relative to the bottom using correlation velocity measuring sonar, the method comprising steps of (1) Select transmit code for acoustic pulses, whose auto-correlation has a peak at a non-zero time delay;

(2) According to the transmit code, transmit acoustic pulses into fluid medium, and receive echo signals back-scattered by flow layers and the bottom medium;

(3) performer the step (4) if the echo signals in the step (2) includes bottom echo, otherwise return back to the step (1) if the echo signals in the step (2) does not include the bottom echo;

(4) Demodulate and filter the echo signals of bottom medium, and calculate a data bottom medium temporal and spatial correlation function matrix according to the bottom echo;

(5) extract a data matrix for fitting from the data bottom medium temporal and spatial correlation function matrix derived from the step (4); wherein the data matrix for fitting is said data bottom medium temporal and spatial correlation function matrix, or the data matrix for fitting is a localized data bottom medium temporal and spatial correlation function matrix, and the localized data bottom medium temporal and spatial correlation function matrix is derived from steps of (a) perform an absolute value operation on the data bottom medium temporal and spatial correlation function matrix to attain a data bottom medium temporal and spatial correlation function absolute value matrix, and elements of said data bottom medium temporal and spatial correlation function absolute value matrix having a maximum value $E_{Max}$;

(b) set a threshold value $\lambda$, wherein $0<\lambda<1$, preferably $0.7<\lambda<1$, wherein those elements in the absolute value matrix with numerical value less than $\lambda E_{Max}$ is set to zero, those elements with numerical value equal to or larger than $\lambda E_{Max}$ is retained, and the localized bottom medium temporal and spatial correlation function absolute matrix can be derived by operating all the elements;

(6) set a search range of the unknown parameter ensemble $\Theta_1=\{\overline{V}_{1x}, \overline{V}_{1y}, \gamma\}$, wherein $\overline{V}_{1x}, \overline{V}_{1y}$ are average values of vessel's velocities relative to the bottom in x, y directions respectively, y is width factor;

(7) fit the data matrix for fitting derived from the step (5) with a theoretical function in the search range of the unknown parameter ensemble $\Theta_1$; the fitting algorithm uses a sequential quadratic programming method based on the maximum likelihood principle or based on the nonlinear least square principle, the theoretical function being $$\phi(d, \Theta_1, \tau)=B\ J_0(\gamma\ \beta_2\theta)$$

wherein B is a constant, $\theta$ is the incident angle of the acoustic wave, $\tau$ is time delay, d is the distance between receive elements of the sonar array, $J_0(\cdot)$ is zero-rank Bessel function;

$$\beta_2 = \frac{\omega_0}{c}\left((\tau\overline{V}_{1x}+d_x)^2+(\tau\overline{V}_{1y}+d_y)^2\right)^{1/2},$$

wherein $\omega_0$ is the central frequency of the transmit signal, c is the velocity of sound, $d_x$ and $d_y$ are components of d in x direction and y direction respectively;

(8) attain average values $\{\overline{V}_{1x},\overline{V}_{1y}\}$ of velocities relative to the bottom obtained from the fitting results, and store the results.

The steps (1)~(8) can be repeated for the next measurement of vessel's velocity relative to the bottom. When repeating the step (6), a previous measured velocity of the vessel relative to the bottom or an average value of multiple previous measured velocities of the vessel relative to the bottom is used as the initial value of the search range of the unknown parameter ensemble $\Theta_1$.

The present invention further provides a correlation velocity measuring sonar system, including a sonar array (200) and an electronic subsystem, the sonar array (200) having a transmit sonar array and a receive sonar array, and the electronic subsystem includes a computer (406), wherein the computer (406) comprises:

An initialization module for initializing software and hardware;

A signal coding module for selecting transmits code for acoustic pulse, whose autocorrelation has a peak value at a non-zero time delay;

A transmit/receive module for transmitting acoustic pulses into fluid medium, and receive echo signals backscattered by flow layers and bottom medium;

An identification module for identifying whether bottom echo is in the echo signals received by the transmit/receive module;

A bottom extraction module for extracting bottom echo from the echo signals received by the transmit/receive module;

A demodulation and filter module for demodulating and filtering the bottom echo in the bottom extraction module;

A matrix calculation module for calculating data bottom medium temporal and spatial correlation function matrix according to the demodulated and filtered bottom echo;

a matrix extraction module for extracting a data matrix for fitting from the data bottom medium temporal and spatial correlation function matrix derived by the matrix calculation module; wherein the data matrix for fitting extracted by the matrix extraction module is the data bottom medium temporal and spatial correlation function absolute value matrix, or a localized bottom medium data temporal and spatial correlation function absolute value matrix, when the localized bottom medium data temporal and spatial correlation function absolute value matrix is used as the data matrix for fitting, the matrix extraction module comprises an absolute value calculation unit for performing an absolute value operation on the data bottom medium temporal and spatial correlation function matrix to attain a data bottom medium temporal and spatial correlation function absolute value matrix; and a localization unit for selecting a maximum value $E_{Max}$ in the data bottom medium temporal and spatial correlation function absolute value matrix, and setting a threshold value $\lambda$, wherein $0<\lambda<1$, and for setting those elements in the absolute value matrix with numerical value less than $\lambda E_{Max}$ to zero and retaining those elements with numerical value equal to or larger than $\lambda E_{Max}$ to attain the localized bottom medium temporal and spatial correlation function absolute matrix by operating all the elements;

a parameter module for storing the search range of the unknown parameter ensemble $\Theta_1=\{\overline{V}_{1x}, \overline{V}_{1y}, \gamma\}$, wherein $\overline{V}_{1x}, \overline{V}_{1y}$ are average values of vessel's velocities relative to the bottom in x, y directions respectively, $\gamma$ is width factor, wherein the initial value of the search range of the unknown parameter ensemble 91, stored in the parameter module is a previous measured velocity of the vessel relative to the bottom or an average value of multiple previous measured velocities of the vessel relative to the bottom;

A fit module for fitting the data matrix derived from the matrix extraction module with a theoretical function in the search range of the unknown parameter ensemble $\Theta_1$; the fitting algorithm using a sequential quadratic programming method based on the maximum likelihood principle or based on the nonlinear least square principle, the theoretical function being $\phi(d, \Theta_1, \tau) = B\, J_0(\gamma\beta_2\theta);$ wherein B is a constant, $\theta 0$ is the incident angle of the acoustic wave, r is time delay, d is distance between receive elements of the sonar array, $J_0(\cdot)$ is zero-rank Bessel function;

$$\beta_2 = \frac{\omega_0}{c}\left((\tau\overline{V}_{1x}+d_x)^2+(\tau\overline{V}_{1y}+d_y)^2\right)^{1/2},$$

wherein $\omega_0$ is the central frequency of the transmit signal, c is the velocity of sound, $d_x$ and $d_y$ are components of d in x direction and y direction respectively; and A velocity storage module for storing average values $\{\overline{V}_x, \overline{V}_y\}$ of the vessel's velocities relative to the bottom derived from fitting results of the fit module.

In the correlation velocity measuring sonar system of the present invention, the transmit sonar array composed of transmit transducers and the receive sonar array composed of receive transducers are multistatic. The receive transducers in the receive sonar array are arranged to enable a maximum number of distance vectors among the receive transducers. The transmit transducers in the transmit sonar array tightly abut with each other. In an embodiment, the transmit sonar array includes seven transmit transducers, and the receive sonar array includes eight receive transducers.

The present invention has the following advantages:

(1) When measuring velocities of the vessel relative to the bottom, the theoretical bottom medium sonar array temporal and spatial correlation function provided by the present invention is applicable not only to far field region, i.e. planar wave region, but also Fraunhofer region, i.e. spherical wave region. However, the conventional acoustic correlation velocity measuring theory is only applicable to the far field region, so that it is difficult to attain good data in a relative large short-distance scope. The theory of the invention makes the scope less. Moreover, the bottom medium sonar array temporal and spatial correlation function of the invention is succinctly expressed by zero-rank Bessel function and in good coincidence with experiments. The conventional theory is expressed in series forms of Bessel function and legendary function, which is inconvenient in use, or is expressed in experiential formulas with no sufficient physical foundation.

(2) The fitting algorithm of the invention uses a sequential quadratic programming method based on the maximum likelihood principle, or based on the nonlinear least square principle to fit measured data with the theoretical sonar array temporal and spatial correlation function to attain velocities. Compared with the conventional simplex method, the method of the present invention has faster convergence rate, higher measurement accuracy. Especially, velocity estimation based on nonlinear least square principle, compared with the maximum likelihood principle, has better robustness and small calculation load. In particular to the correlation velocity measuring sonar in actual situation, environmental noises may be uneven in space, the amplitudes and phrases of the receive elements of the sonar array may disaccord from each other. These two factors will affect the least square principle less than the maximum likelihood principle.

(3) The present invention uses the method to calculate absolute value of and to localize the data bottom medium temporal and spatial correlation function matrix and uses regions with large amplitudes in the matrix to calculate velocities. The absolute value of the correlation function is only related with the average horizontal velocities $\overline{V}_X$ and $\overline{V}_Y$ of the vessel, and regions with low signal noise ratio are eliminated. These two signal processing measures raise the measurement accuracy.

(4) The invention uses the average value of measured velocities from the N-m$^{th}$ time to the N$^{th}$ time as the initial value of estimated velocity at the N+1$^{th}$ time, which raises calculation speed and reduces hardware cost.

(5) The present invention provides a new sonar array with transducer geometry, wherein transmit transducers and receive transducers are multistatic, so the transmit beam width and the receive beam width can be selected reasonably.

Numerals:

Vessel 100 sonar array 200 underwater electronic subsystem 300

Dry end 400 terminal 500

DETAILED DESCRIPTION OF THE PREFERRED EMBODIMENT

The present invention will be described in detail hereinafter in conjunction with the drawings and embodiments.

Figure 1:
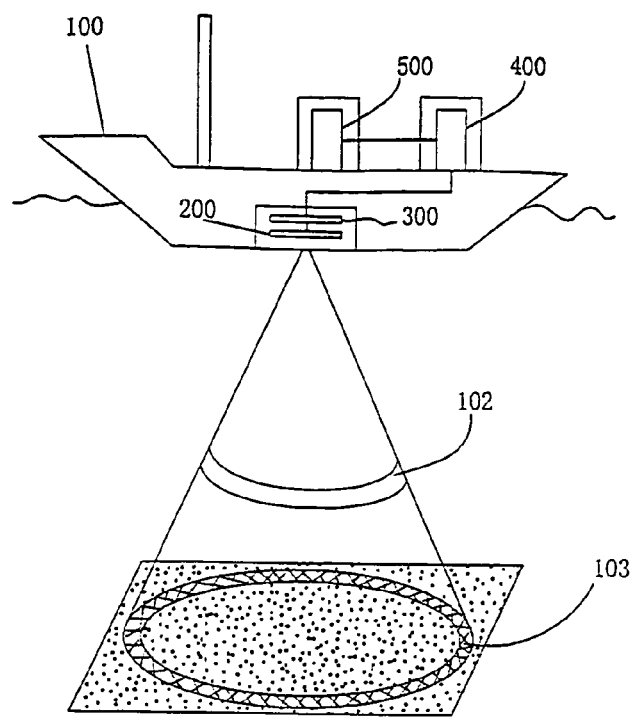
FIG. 1 is a schematic view of a correlation velocity-measuring sonar system in operation.

With reference to FIG. 1, a correlation velocity measuring sonar system in accordance with the present invention, used for measuring velocities of vessel relative to the bottom, is installed on a vessel (100). The correlation velocity measuring sonar system generally includes a sonar array (200) and an electronic subsystem. The electronic subsystem includes an underwater electronic subsystem (300), a dry end (400) and a terminal (500). The sonar array (200) and underwater electronic subsystem (300) are installed beneath the water, and the dry end (400) and terminal (500) are installed above the water. A transmit transducer array of the sonar array (200) transmits acoustic pulses into the water. The acoustic pulse 102 in one pulse width spreads in the water and encounters the seabed in a ring (103) so as to generate a seabed echo. The seabed echo are received by the receive transducer array of the sonar array (200), and processed by the electronic subsystem to calculate the velocity of the vessel.

Figure 3:
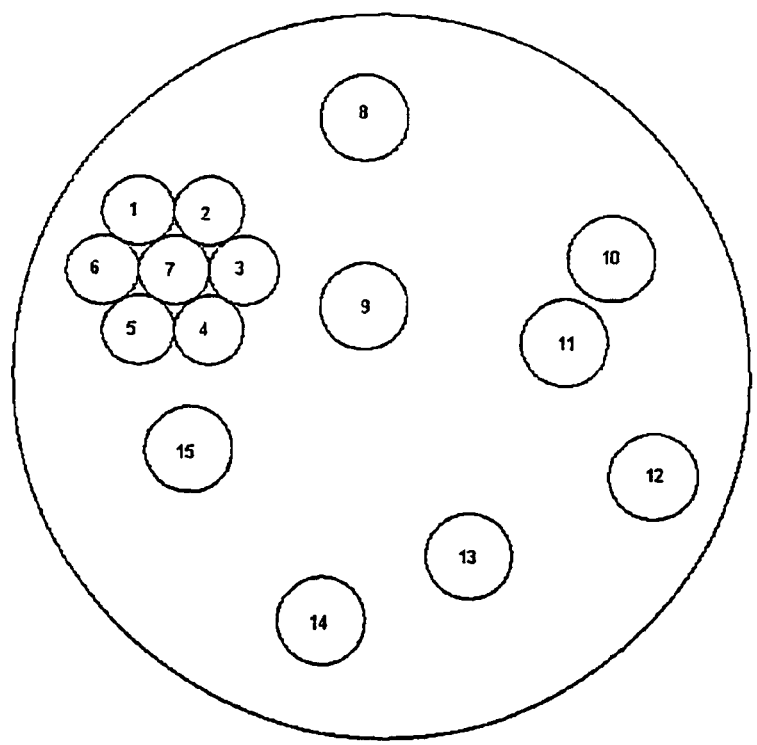
FIG. 3 is a schematic view of the sonar array geometry of the correlation velocity measuring sonar system.
Figure 2:
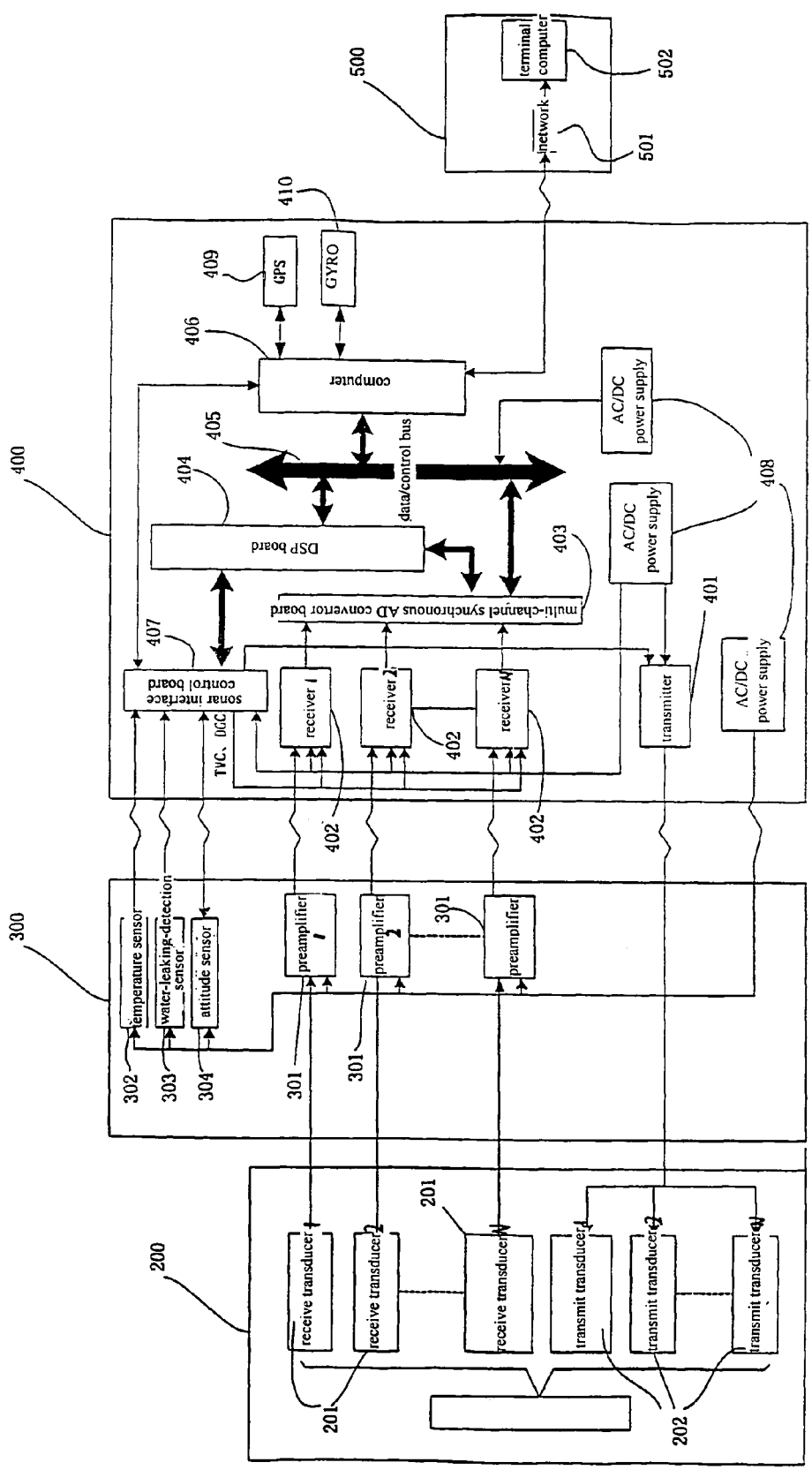
FIG. 2 is a schematic view of the structure of the correlation velocity-measuring sonar system.

The detailed structure of the correlation velocity measuring sonar system is illustrated in FIG. 2. The sonar array (200) includes receive transducers (201) and transmit transducers (202). The receive transducers (201) constitute the receive transducer array. The transmit transducers (203) constitute the transmit transducer array. A sonar array geometry (200) is illustrated in FIG. 3, wherein elements (1–7) are transmit transducers which tightly abut with each other; and elements (8–15) are receive transducers which are arranged under the principle of enabling a maximum number of distance vectors among the receive transducers.

With reference to FIG. 2, the underwater electronic subsystem (300) includes multi-channel preamplifiers (301) connected to the receive transducers (201). The underwater electronic subsystem (300) also includes a temperature sensor (302), a water-leaking-detection sensor (303) and an attitude sensor (304), all connected to a sonar interface control board (407) in the dry end (400).

The dry end (400) includes a transmitter (401) connected to the transmit transducer (202), multi-channel receivers (402) connected to the preamplifiers (302), a multi-channel synchronous AD converter board (403) connected to the multi-channel receivers (402), and a DSP board (404) connected to the multi-channel synchronous AD converter board (403). The dry end (400) also includes a computer (406) connected to the DSP board (404) and multi-channel synchronous AD converter board (403) respectively by a data/control bus (405). The dry end (400) also includes the sonar interface control board (407) connected to the multi-channel receivers (402), the transmitter (401), the DSP board (404) and the computer (406) respectively, and an AC/DC power supply (408) connected to the sonar interface control board (407), the multi-channel receivers (402), the transmitter (401), the data/control bus (405), the temperature sensor (303), the water-leaking-detection sensor (304) and the attitude sensor (304) respectively. The dry end (400) also includes a GPS receiver (409) and a GYRO (410) connected to the computer (406).

The terminal (500) includes a terminal computer (502) connected to the computer (406) by a network (501).

Figure 4:
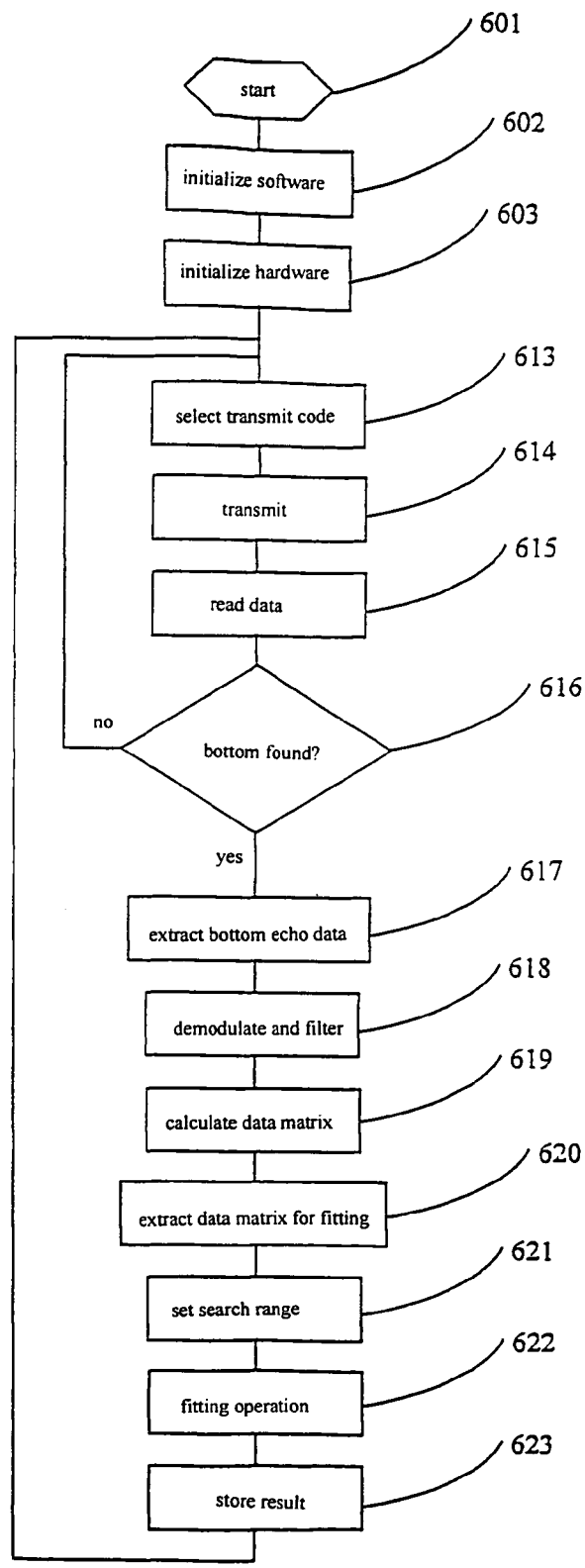
FIG. 4 is a flow chart of the software for the correlation velocity measuring sonar system.

A special velocity measuring program is stored in the computer (406). The program includes initialization module, signal coding module, transmit/receive module, identification module, bottom extraction module, and demodulation and filter module, matrix calculation module, matrix extraction module, parameter module, fit module and velocity storage module. The program is executed according to steps illustrated in FIG. 4.

The step (601) is the start, in which the terminal computer (502) sends instructions to the computer (406) by the network (501), and then the program in the computer (406) starts to enable the sonar system in an operating state. In the steps (602) and (603), the initialization module initializes software and system hardware. In the step (613), according to the depth of the bottom, signal coding module selects transmit code, whose autocorrelation has a peak value at a non-zero time delay. In the step (614), transmit/receive module sends the instructions of the computer (406) through the data/control bus (405) to the DSP board (404), and the DSP board (404) send transmit signals to the transmitter (401) and the transducer (202) to send acoustic pulses into the fluid medium. In the step (615), transmit/receive module control the receive transducers (203) to receive echoes backscattered by the fluid medium and seabed medium, and to feed the echoes to the multi-channel receivers (402) through the preamplifiers (302) and then to the DSP board (404) through the multi-channel synchronous AD converter board (403). In the step (616), the identification module controls the DSP board (404) to identify whether bottom echo is included in the received echoes. If the result is no, the program returns back to the step (613); if the result is yes, the program performs the step (617). In the step (617), the bottom extraction module controls the DSP board (404) to extract bottom echo from the echo signals. In the step (618), the demodulation module controls the DSP board (404) to demodulate and filter the bottom echo.

In the step (619), matrix calculation module calculates the data bottom medium temporal and spatial correlation function matrix according to the demodulated and filtered bottom echo signals.

Figure 5:
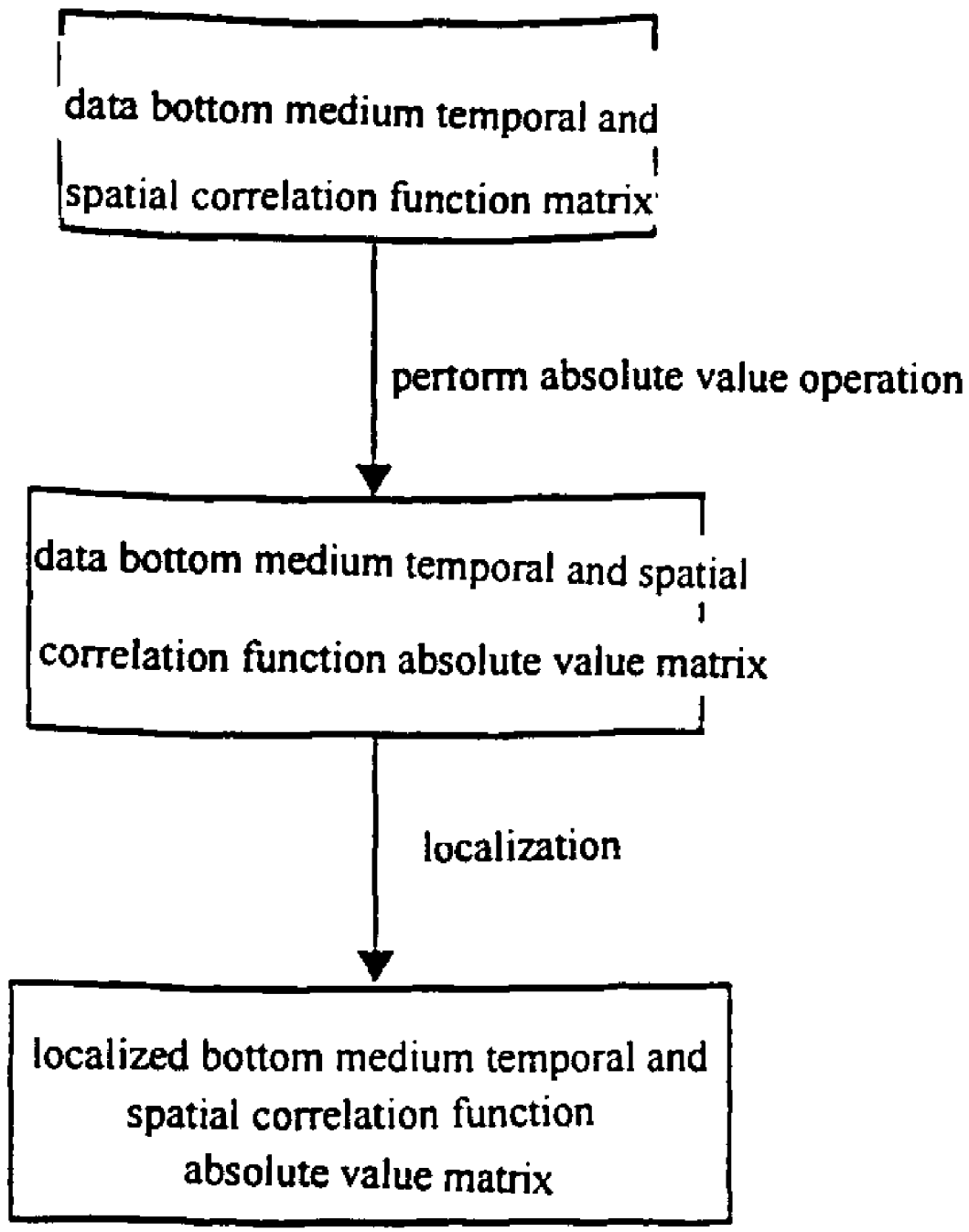
FIG. 5 is a detailed flow chart of the step 620 in FIG. 4.

In the step (620), the matrix extraction module extracts a data matrix for fitting from the data bottom medium temporal and spatial correlation function matrix. This data matrix will be fitted with a theoretical function provided by the present invention in the step (622). In detail, during the step (620), the matrix extraction module can directly use the data bottom medium temporal and spatial correlation function matrix derived from the step (609) as the data matrix for fitting, or use the further processed data bottom medium temporal and spatial correlation function matrix derived from the step (609) as the data matrix for fitting. In the latter, matrix extraction module includes an absolute value calculation unit and a localization unit, for which a detailed flow charts, is illustrated in FIG. 5. With reference to FIG. 5, the absolute value calculation unit performs an absolute value operation on the data bottom medium temporal and spatial correlation function to attain an absolute value matrix of data bottom medium temporal and spatial correlation function. Then, the localization unit performs a localization operation on the absolute value matrix of the data temporal and spatial correlation function. Finally, the localized matrix is used as the data matrix for fitting. The localization means selecting the maximum value $E_{Max}$ from the data bottom medium temporal and spatial correlation function absolute value matrix, and setting a threshold value X, wherein $0<\lambda<1$. Then, those elements in the absolute value matrix with numerical value less than $\lambda E_{Max}$ is set to zero, those elements with numerical value equal to or larger than $\lambda E_{Max}$ is retained. The localized data bottom medium temporal and spatial correlation function absolute matrix can be derived by performing the operation on all the elements. The localizing operation only chooses the elements larger than or equal to $\lambda E_{Max}$, i.e. chooses the region with high signal noise ratio and eliminates the region with low signal noise ratio, thus further simplifying calculation and improving measurement accuracy. In practice, the threshold value λ is preferred between 0.7 and 1.

After the data matrix for fitting is obtained, the fitting operation of the data matrix and theoretical function matrix is performed to attain the vessel's velocity relative to the bottom from the fitting results. In accordance with the present invention, a theoretical bottom medium sonar array temporal and spatial correlation function is expressed as follow $$Rs(\tau,\Theta,d)=B\lfloor \exp\{if(\overline{V}_z)\}\rfloor J_0(\gamma \ \beta_2 \ \theta) \quad (1)$$

wherein B is a function of $f(\overline{V}_z)$, f is a certain function, $\overline{V}_z$ is an average of vessel's velocity relative to the bottom in z direction, d is distance between receive elements of the sonar array, τ is time delay, θ is the incident angle of; the acoustic wave, $J_0(\bullet)$ is zero-rank Bessel function;

$$\beta_2 = \frac{\omega_0}{c}\left((\tau \overline{V}_{1x} + d_x)^2 + (\tau \overline{V}_{1y} + d_y)^2\right)^{1/2},$$

wherein $\omega_0$ is the central frequency of the transmit signal, c is the velocity of sound, $d_x$ and $d_y$ are components of d in x direction and y direction respectively.

According to the equation (1), $Rs(\tau,\Theta,d)$ is related with $\overline{V}_x, \overline{V}_y, \overline{V}_z$. If the three-dimension velocities are all estimated together, the calculation is complex and the accuracy is low. After performing absolute value operation on the theoretical bottom medium sonar array temporal and spatial correlation function expressed in equation (1), an equation is expressed as follow:

$$\phi(d, \Theta_1, \tau)=|R_s(d, \Theta_1, \tau)|=B \ J_0(\gamma \ \beta_2 \ \theta) \quad (2)$$

Where, B is a constant. A matrix constructed by absolution values of the theoretical bottom medium temporal and spatial correlation function expressed in the equation (2), is called theoretical bottom medium temporal and spatial correlation function absolute value matrix, which is related only with $\overline{V}_x$ and $\overline{V}_y$. This calculation is succinct and the accuracy is high. In practice, $\overline{V}_x, \overline{V}_y$ are often sufficient. Moreover, $\overline{V}_z$ can be measured by other devices.

In the step (621), the parameter module sets and stores a search range of the unknown ensemble $\Theta_1=\{\overline{V}_x, \overline{V}_y, \gamma\}$, wherein the search range of the unknown ensemble $\Theta_1$, is set as large as possible at first measurement to include the true velocity of the vessel relative to the bottom in the search range. In the following measurements, the previous measurement result or an average value of multiple previous measurement results is preferably used as the initial value for the search range. Therefore, the calculation speed is high, and the hardware cost is low.

In the step (622), the fit module controls the DSP board (404) to fit the data matrix derived from the matrix extraction module during the step (612) with the equation (2) so as to attain the average of vessel's velocities relative to the bottom. Here, the fitting algorithm can be a sequential quadratic programming method based on the maximum likelihood principle, or preferably a sequential quadratic programming method based on the nonlinear least square principle.

In the step (623), the velocity storage module feeds the fitting results derived from the step (623) to the computer (406) through the data/control bus (405) and the computer stores the fitting results in the memory. After the step (623), the program can return back to the step (613) for the next measurement.

Finally, data from the temperature sensor (302), the water-leaking-detection sensor (303) and the attitude sensor (304) are fed to the computer (406) by the sonar interface control board (407). The computer (406) cooperates data from the GPS (409) and GYRO (410) and then sends the final results to the terminal computer (502) by the network (501).

Figure 6:
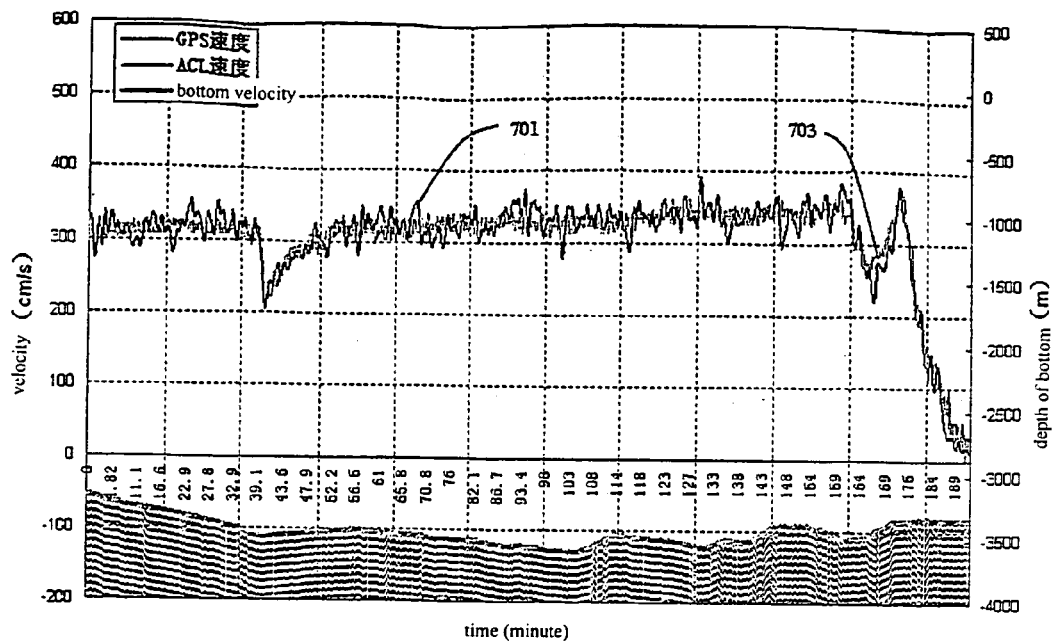
FIG. 6 is a diagram of measured vessel velocity comparison between the correlation velocity measuring sonar system (ACL) and differential GPS at a water area 3500$m$ deep; wherein FIG. 6$a$ illustrates measured velocity amplitudes 701 and 703 by these two equipments, and FIG. 6$b$ illustrates measured velocity directions 702 and 704 by these two equipments.
Figure 6:
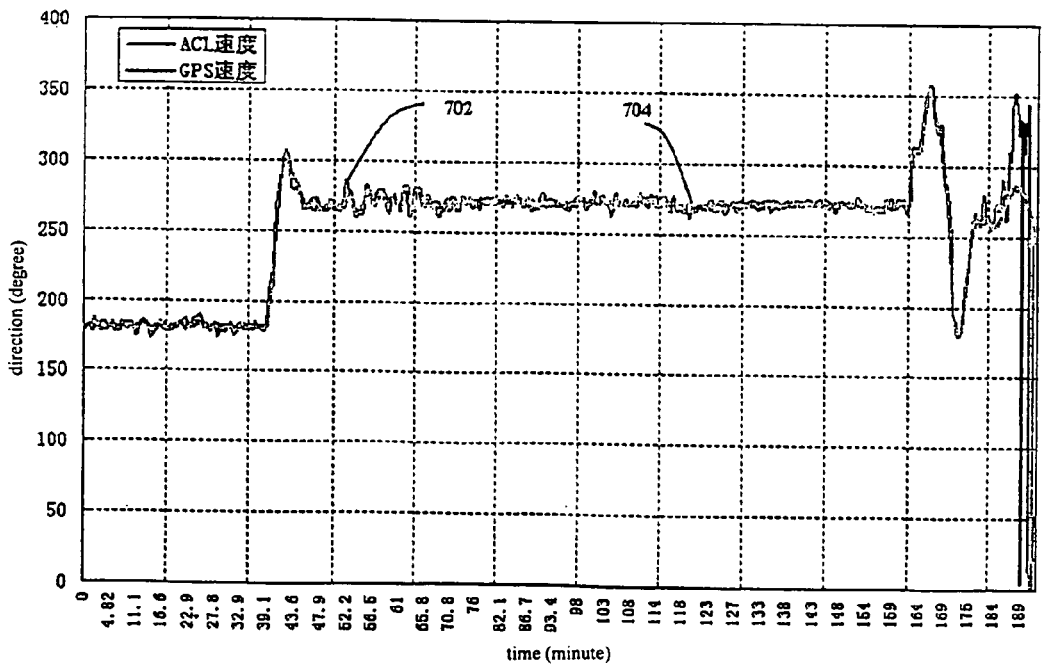

FIG. 6 illustrates diagrams of the vessel's velocities (100) relative to the bottom measured by the correlation velocity measuring sonar system with 23.5 kHz central frequency, 4.4 kHz bandwidth of the present invention and a differential GPS respectively. FIG. 6a illustrates the amplitudes of the vessel's velocities (701, 703) relative to the bottom measured by these two apparatuses in a time interval, wherein the abscissa represents time, and the ordinate represents amplitude of velocity. FIG. 6b illustrates directions (702, 704) of vessel's velocities relative to the bottom measured by these two equipments in a time interval, wherein the abscissa represents time, and the ordinate represents direction. The curves (701, 703) represent data measured by the correlation velocity measuring sonar system of the invention; and the curves (702, 704) represent data measured by the differential GPS. The results by these two equipments are quite coincided with each other.

The invention claimed is:

1. A method for measuring a vessel's velocity relative to the bottom using a correlation velocity measuring sonar, the method comprising steps of
   (1) Select a transmit code for acoustic pulses;
   (2) according to the transmit code, transmitting acoustic pulses into a fluid medium, and receiving echo signals backscattered by flow layers and the bottom;
   (3) excute step (4) if the echo signals in step (2) includes bottom echo signals, otherwise return back to step (1) if the echo signals in step (2) do not include bottom echo signals;
   (4) Demodulate and filter the bottom echo signals, and calculate the data bottom medium temporal and spatial correlation function matrix according to the bottom echo signals;
   (5) Extract a data matrix for fitting from the data bottom medium temporal and spatial correlation function matrix derived from step (4);
   (6) set a search range of the unknown parameter ensemble $\Theta_1 = \{\overline{V}_{1x}, \overline{V}_{1y}, \gamma\}$, wherein $\overline{V}_{1x}, \overline{V}_{1y}$ are average values of vessel's velocities relative to the bottom in x, y directions respectively, $\gamma$ is width factor;
   (7) Fit the data matrix for fitting derived from the step (5) with a theoretical function in the search range of the unknown parameter ensemble $\Theta_1$; the theoretical function being $$\varphi(d, \Theta_1, \tau) = B\, J_0(\gamma\, \beta_2\, \theta)$$

wherein B is a constant, $\theta$ is the incident angle of the acoustic wave, $\tau$ is time delay, d is distance between receive elements of the sonar array, $J_0(\cdot)$ is zero-rank Bessel function;

$$\beta_2 = \frac{\omega_0}{c}\left((\tau \overline{V}_{1x} + d_x)^2 + (\tau \overline{V}_{1y} + d_y)^2\right)^{1/2},$$

wherein $\omega_0$ is the central frequency of the transmit signal, c is the velocity of sound, $d_x$ and $d_y$ are components of d in x direction and y direction respectively;
   (8) Attain average values $\{\overline{V}_{1x}, \overline{V}_{1y}\}$ of velocities relative to the bottom derived from the fitting results, and storing the results.

2. The method for measuring the vessel's velocity relative to the bottom using correlation velocity measuring sonar as claimed in claim 1, characterized in that steps (1)~(8) are repeated for the next measurement of the vessel's velocity relative to the bottom.

3. The method for measuring the vessel's velocity relative to the bottom using correlation velocity measuring sonar as claimed in claim 1, characterized in that the autocorrelation of the transmit code in step (1) has a peak value at a non-zero time delay.

4. The method for measuring the vessel's velocity relative to the bottom using correlation velocity measuring sonar as claimed in claim 1, characterized in that the data matrix for fitting in step (5) is said data bottom medium temporal and spatial correlation function matrix.

5. The method for measuring the vessel's velocity relative to the bottom using correlation velocity measuring sonar as claimed in claim 1, characterized in that the data matrix for fitting in step (5) is a localized data bottom medium temporal and spatial correlation function matrix, and the localized data bottom medium temporal and spatial correlation function matrix is derived from steps of
   (a) perform an absolute value operation on the data bottom medium temporal and spatial correlation function matrix to attain a data bottom medium temporal and spatial correlation function absolute value matrix, and elements of said data bottom medium temporal and spatial correlation function absolute value matrix having a maximum value $E_{Max}$;
   (b) set a threshold value $\lambda$, wherein $0<\lambda<1$, wherein those elements in the absolute value matrix with numerical value less than $\lambda E_{Max}$ is set to zero, those elements with numerical value equal to or larger than $\lambda E_{Max}$ is retained, and the localized bottom medium temporal and spatial correlation function absolute matrix can be derived by operating all the elements.

6. The method for measuring the vessel's velocity relative to the bottom using correlation velocity measuring sonar as claimed in claim 5, characterized in that the threshold value in the step (b) is $0.7<\lambda\leq 1$.

7. The method for measuring the vessel's velocity relative to the bottom using correlation velocity measuring sonar as claimed in claim 1, characterized in that in step (7), the fitting algorithm uses a sequential quadratic programming method based on the maximum likelihood principle.

8. The method for measuring the vessel's velocity relative to the bottom using correlation velocity measuring sonar as claimed in claim 1, characterized in that in step (7), the fitting algorithm uses a sequential quadratic programming method based on the nonlinear least square principle.

9. The method for measuring the vessel's velocity relative to the bottom using correlation velocity measuring sonar as claimed in claim 2, characterized in that a previous measured velocity of the vessel relative to the bottom or an average value of multiple previous measured velocities of the vessel relative to the bottom is used as the initial value of the search range of the unknown parameter ensemble $\Theta_1$.

10. A correlation velocity measuring sonar system, including a sonar array (200) and an electronic subsystem, the sonar array (200) having a transmit array and a receive array and the electronic subsystem having a computer (406), characterized in that the computer (406) comprises:
    an initialization module for initializing software and hardware;
    A signal coding module for selecting transmits code for acoustic pulse;
    a transmit/receive module for transmitting acoustic pulses into fluid medium, and receiving echo signals backscattered by flow layers and bottom medium;

An identification module for identifying whether bottom echo signals are included in the echo signals received by the transmit/receive module;

A bottom extraction module for extracting bottom echo signals from the echo signals received by the transmit/receive module;

A demodulation and filter module for demodulating and filtering the echo signals of bottom medium in the bottom extraction module;

A matrix calculation module for calculating data bottom medium temporal and spatial correlation function matrix according to demodulated and filtered echo signals of bottom medium;

A matrix extraction module for extracting a data matrix for fitting from the data bottom medium temporal and spatial correlation function matrix derived from the matrix calculation module;

a parameter module for storing the search range of the unknown parameter ensemble $\Theta_1 = \{\overline{V}_{1x}, \overline{X}_{1y}, \gamma\}$, wherein $\overline{V}_{1x}, \overline{V}_{1y}$ are average values of vessel's velocities relative to the bottom in x, y directions respectively, $\gamma$ is width factor;

A fit module for fitting the data matrix derived from the matrix extraction module with a theoretical function in the search range of the unknown parameter ensemble $\Theta_1$, the theory function being $\varphi(d, \Theta_1, \tau) = B\, J_0(\gamma\, \beta_2\, \theta)$;

wherein B is a constant, $\theta$ is the incident angle of the acoustic wave, $\tau$ is time delay, d is distance between receive elements of the sonar array, $J_0(\bullet)$ is zero-rank Bessel function;

$$\beta_2 = \frac{\omega_0}{c}\left((\tau \overline{V}_{1x} + d_x)^2 + (\tau \overline{V}_{1y} + d_y)^2\right)^{1/2},$$

wherein $\omega_0$ is the central frequency of the transmit signal, c is the velocity of sound, $d_x$ and $d_y$ are components of d in x direction and y direction respectively; and A velocity storage module for storing average values $\{\overline{V}_x, \overline{V}_y\}$ of the vessel's velocities relative to the bottom derived from fitting results of the fit module.

11. The correlation velocity measuring sonar system as claimed in claim 10, characterized in that the transmit code generated by the signal coding module has a correlation peak value at a non-zero time delay.

12. The correlation velocity measuring sonar system as claimed in claim 10, characterized in that the data matrix for fitting extracted by the matrix extraction module is the data bottom medium temporal and spatial correlation function matrix.

13. The correlation velocity measuring sonar system as claimed in claim 10, characterized in that the data matrix for fitting extracted by the matrix extraction module is a localized bottom medium data temporal and spatial correlation function absolute value matrix, and the matrix extraction module comprises an absolute value calculation unit for performing an absolute value operation on the data bottom medium temporal and spatial correlation function matrix to attain a data bottom medium temporal and spatial correlation function absolute value matrix; and a localization unit for selecting a maximum value $E_{Max}$ in the data bottom medium temporal and spatial correlation function absolute value matrix, and setting a threshold value $\lambda$, wherein $0 < \lambda \leq 1$, and for setting those elements in the absolute value matrix with numerical value less than $\lambda E_{Max}$ to zero and retaining those elements with numerical value equal to or larger than $\lambda E_{Max}$ to attain the localized bottom medium temporal and spatial correlation function absolute matrix by operating all the elements.

14. The correlation velocity measuring sonar system as claimed in claim 10, characterized in that the fit module is a calculation module using a sequential quadratic programming method based on the maximum likelihood principle for fitting operation.

15. The correlation velocity measuring sonar system as claimed in claim 10, characterized in that the fit module is a calculation module using a sequential quadratic programming method based on the nonlinear least square principle for fitting operation.

16. The correlation velocity measuring sonar system as claimed in claim 10, characterized in that the initial value of the search range of the unknown parameter ensemble $\Theta_1$ stored in the parameter module is a previous measured velocity of the vessel relative to the bottom or an average value of multiple previous measured velocities of the vessel relative to the bottom.

17. The correlation velocity measuring sonar system as claimed in claim 10, characterized in that the transmit array being composed of transmit transducers and the receive array being composed of receive transducers are multistatic.

18. The correlation velocity measuring sonar system as claimed in claim 17, characterized in that the receive elements in the receive array are arranged to enable a maximum number of distance vectors among the receive transducers.

19. The correlation velocity measuring sonar system as claimed in claim 17, characterized in that the transmit transducers in the transmit array tightly abut with each other.

20. The correlation velocity measuring sonar system as claimed in claim 19, characterized in that the transmit array includes seven transmit transducers, and the receive array includes eight receive transducers.

* * * * *